United States Patent [19]

Tate et al.

[11] Patent Number: 4,969,508
[45] Date of Patent: Nov. 13, 1990

[54] WIRELESS THERMOSTAT AND ROOM ENVIRONMENT CONTROL SYSTEM

[75] Inventors: Billy G. Tate, Chattanooga, Tenn.; Roger P. Ries, Champaign, Ill.

[73] Assignee: United Enertech Corporation, Chattanooga, Tenn.

[21] Appl. No.: 469,952

[22] Filed: Jan. 25, 1990

[51] Int. Cl.$^5$ ............................................. F24F 3/00
[52] U.S. Cl. ..................................... 165/22; 236/49.3; 236/51
[58] Field of Search .......................... 236/51, 49.3, 47; 165/22

[56] References Cited

U.S. PATENT DOCUMENTS

| | | | |
|---|---|---|---|
| 4,095,740 | 6/1978 | Wirth | 236/47 |
| 4,585,164 | 4/1986 | Butkovich et al. | 236/51 |
| 4,754,919 | 7/1988 | Otsuka et al. | 236/49.3 |
| 4,824,012 | 4/1989 | Tate | 236/49.3 |

Primary Examiner—William E. Wayner
Attorney, Agent, or Firm—Alan Ruderman

[57] ABSTRACT

An environment control system permitting the occupant of a room or space in a multi-room building sharing a common air supply conduit with other rooms to control the environment in his or her room selectively and/or automatically. The system includes a small wireless portable remote control unit readily accessible to the occupant for selecting predetermined conditions. These conditions are transmitted to a remote receiver which provides signals to a main control unit coupled to external environmental control units such as motors which operate damper valves in the room, air conditioning units supplying air to the common conduit heaters within the room and the like. Both the remote control unit and the main control unit include a programmed microcontroller. The portable control unit may be used to select the desired environmental conditions within the room while the lights are on and transmits this information to the main control unit which acts to energize and deenergize the external control units. When the occupant leaves the room and turns the light off, infrared transmissions from the portable control unit cease after a short period of time and the main control unit thereafter takes over and controls the temperature in the room in accordance with programmed conditions.

19 Claims, 11 Drawing Sheets

WIRELESS THERMOSTAT AND ROOM ENVIRONMENT CONTROL SYSTEM

BACKGROUND OF THE INVENTION

This invention relates to a system for controlling the environment automatically or selectively in a particular room or space of a multi-room building by control of at least the air flow dampers in the room, and more particularly to a system for such control wherein rooms or spaces in the same air flow circuit may have the temperature and other environmental conditions selectively controlled by the occupant by means of a portable wireless control unit which may be located on a desk or the like, the system including features for reducing automatically the cooling or heating supplied to the room when the room is unoccupied.

In multi-room buildings, such as office buildings, it is generally found heating and cooling systems over temper the air or are inadequate for various reasons. For example, over tempering the air can cause an occupant to have a tendency to over or under adjust the thermostat which may cause the occupant to make many thermostat changes throughout the day. Additionally, when thermostats are located on a particular wall and there is a solar load change during the day, the varying sensitivity of individuals with different metabolism rates, may result in numerous trips to the thermostat. A control at the occupant work station would thus permit greater productivity.

In Tate U.S. Pat. No. 4,824,012, assigned to the same assignee as the present invention, a system is disclosed which permits a remote transmitter to close the damper in each individual room of a group of rooms sharing a common air supply with other rooms, wherein only one room has a thermostat. The control of the damper in any particular room is independent of the damper settings in the other rooms so that the occupant of each room void of the thermostat may close the damper when the temperature of the air becomes uncomfortable, and after a time delay the damper will automatically reopen. Although this system provides a great convenience economically, the shutting of the damper requires the attention of the occupant, i.e., the occupant must initiate the damper closing operation. Additionally, when the occupant leaves for the day, or for a period of time, the damper remains open and the room is supplied with air under conditions called for by the main thermostat.

SUMMARY OF THE INVENTION

The present invention provides a system which permits the occupant of a particular room or space of a multi-room building having an air flow supply in a common circuit with other rooms or spaces to control the environment in his or her room selectively and/or automatically by means of a wireless portable remote control unit which may be disposed at the work station of the person in the room. The system includes a small controller unit which may be held by the occupant of the room or disposed on his or her desk or the like for transmitting information to a remote receiver, preferably mounted in the ceiling of the room, and which in turn provides signals to a main control unit physically coupled to external environmental control units such as the air conditioning system, heaters, damper motors and the like.

The portable remote control unit includes temperature sensing and selection means which permits selection of a cooling or heating mode, an energy saving mode, a light sensing circuit for overriding the preselected conditions when the lights in the room are off, and an infrared transmitter for transmitting data to the infrared receiving unit as required when the lights are on. The infrared receiving unit receives the signals from the portable remote unit and feeds it to the main control unit which in turn activates circuits for opening and closing the air flow dampers and preferably also turning on or off heating units and/or the air conditioning compressor in those systems having an external air conditioning unit. When the lights are off, the portable unit no longer transmits information, and the main control unit takes over and controls the temperature in the room in accordance with the programmed data.

The portable control unit includes a keypad used to control the operation of the system which together with the temperature sensing means and the room light sensing means signals a programmed microcontroller within the unit to activate the infrared transmitter when required and to provide signals for a visual display of the current and the selected conditions. The control unit for controlling the external circuits interfaces with the infrared receiver receiving messages from the portable unit and through programmed control circuitry therein controls signals to the associated environmental conditioning devices.

Accordingly, it is a primary object of the present invention to provide a system for controlling the environmental conditions within a room or space which permits selection of the desired conditions and which may be overridden to economical conditions when the room is unoccupied.

It is another object of the present invention to provide a room environmental control system which is sensitive to room light so that manually selected conditions will be changed to more economical conditions when the room lights are off.

It is a further object of the present invention to provide a system including a portable remote unit for selecting environmental conditions within a room or the like, the unit transmitting information by wireless transmission to a main control unit which signals various environmental control devices to start and stop dependent upon the variation of room conditions from that selected, the system further providing for overriding the portable unit when the room lights have been turned off and for thereafter controlling the room conditions by preprogrammed information stored in the main control unit.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
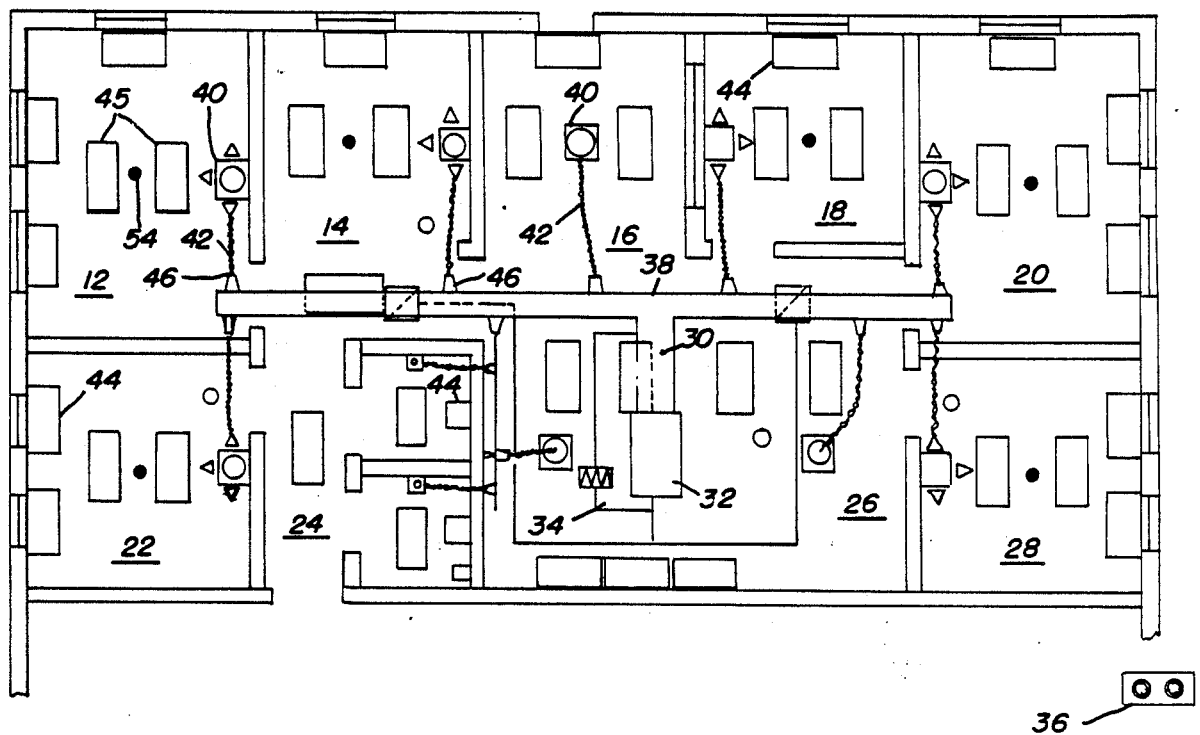
FIG. 1 is a fragmentary floor plan view in diagrammatic form of a typical suite of offices in a building incorporating apparatus according to the principles of the present invention and illustrating an air conditioner compressor unit at the exterior of the building.

Referring to the drawings, FIG. 1 illustrates a typical suite of offices or work spaces 12, 14, 16, 18, 20, 22, 24, 26, 28 supplied with environmentally controlled air from a common supply duct 30, receiving air from an air handler 32 which is fed by a return duct 34, the air handler typically comprising a refrigerant circulated through a heat exchanger over which the air passes, the refrigerant being connected a compressor 36 external of the building in which the offices are located. In lieu of the air handler and compressor configuration, the main supply duct may be cooled by other means such as a central chiller circulating water through a controller disposed in the supply duct. Air is supplied from the common supply duct through a branch line 38 to outlets, for example 40, in the individual offices through respective flexible conduits, for example 42, in conventional manner. Additionally, each office or space may include respective heat panels 44 or the like utilized during the heating season, and of course lights 45. Mounted in communication with each outlet and the respective flexible conduit is a motor controlled damper 46 having a butterfly valve 48 illustrated in FIG. 2, which may be moved by control signals driving at least one motor 50 to incrementally open or shut the respective outlet by control means including a portable controller unit 52 placed at a convenient location in the respective office, such as on the desk of the occupant thereof, a receiver 54 mounted in the ceiling of the room and a control unit 56 also either mounted in the ceiling or on the duct 38 and having external connections 58 (illustrated by dash lines for clarity) to the damper motor, and preferably also to the relays of the air conditioning compressor 36 and blower where such air conditioning systems are utilized, the relays of the heater units 44 and other auxiliary units, e.g., an exhaust fan, humidifier, and other environmental control units, when such units are used, in accordance with the present invention.

The system of the present invention includes the portable control unit 52 which effectively is a thermostat-transmitter unit which transmits control signals to the ceiling mounted receiver unit 54, which preferably is mounted in the central portion of the ceiling of the room, the transmitter acting to send control signals by infrared energy to the receiver unit, and the receiver retransmits these signals to the main control unit 56 to which it is electrically connected by wiring 60 (illustrated by dash lines for clarity), the latter as aforesaid being connected through wiring to the damper motors, the compressor or chilling water controller depending on the system and the heaters.

Figure 3:
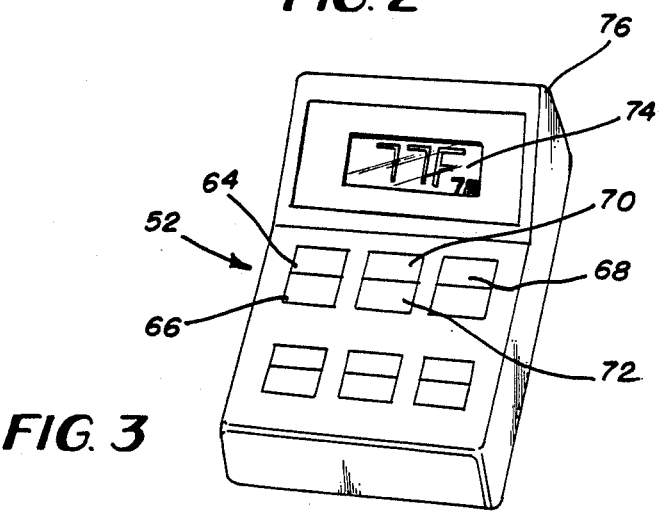
FIG. 3 is a perspective view of the portable control unit constructed in accordance with the principles of the present invention.
Figure 4:
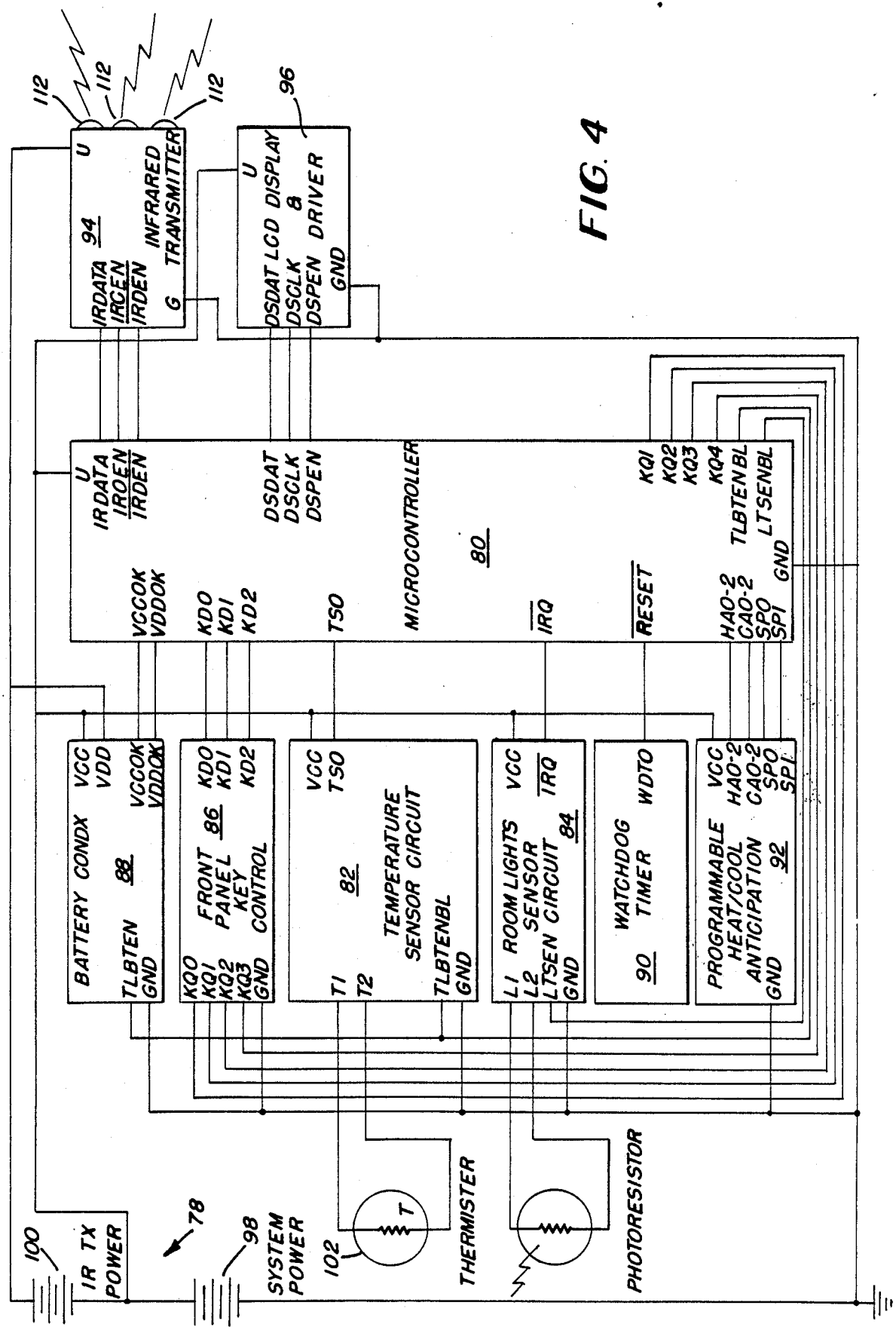
FIG. 4 is a functional block diagram of the electrical circuitry of the portable control unit of FIG. 3.

The portable thermostat-transmitter unit 52 as illustrated in FIG. 3 is a small hand holdable housing with an external keypad having a number of touch keys 62, preferably 12 such keys for selecting various functions including a heat and coolcycle keys 64, 66, an economy mode key 68, and a pair of keys 70, 72 for selecting either the raising or lowering of the temperature in the room. The mode selected, the room temperature and the selected room temperature are displayed by a liquid crystal display (LCD) 74 in a window in the unit. Referring to FIG. 4 where a block diagram of the portable control unit 52 is illustrated, the overall control circuitry may be readily understood by those skilled in the art with reference to the following description.

The components of the thermostat-transmitter unit are mounted within the housing 76 on a main circuit board or on the display circuit board, the main circuit board including a battery power supply 78, a stored-program controlled processor 80, preferably of the one-chip type, a temperature sensing control circuit 82, a room lights sensing circuit 84, keypad interfacing circuits 86, and may include auxiliary optional battery power checking circuits 88, software upset circuits designated a watch dog timer 90, and programmable heat and cooling anticipation jumpers 92. The infrared transmitter portion 94 of the unit is also mounted on the main circuit board. The display board includes the LCD display and display driver circuitry 94.

The unit is battery powered, preferably by two small Lithium batteries 98, 100 one of which 98 operates the unit and the other of which 100 is wired in series with the first to provide the necessary operating voltage for the infrared transmitter. It is expected that the batteries will be operable from two to five years depending on the amount of time that the room is dark resulting in a low power state.

The processor 80 includes an arithmetic logic unit, a plurality of registers for manipulating data, read-only memory (ROM) for storing a set of instructions or operating program, a random-access memory (RAM) for a temporary storage of operating parameters and the like, and input/output (I/0) ports for accepting the various input control signals and information and outputting control signals to the various controlled devices. In the preferred embodiment, the stored program controlled processor is selected from the MC68705 family of 8-bit EPROM microcomputers manufactured by Motorola Semiconductor Products, Inc. of Austin, Texas 78721 and is preferably a MC68HC705C8P (CMOS) microcomputer which includes a CPU, on-chip clock, EPROM for the operating program or instruction set described below in relation to FIGS. 8-10, ROM, and RAM. To conserve battery power, it is operated at a very low frequency, e.g., in the order of 32768 Hz, regulated by a small crystal.

The temperature sensing circuit 82 includes a negative coefficient thermistor 102 connected in a conventional circuit with an RC oscillator, the thermistor being connected in series with the resistor (preferably variable for calibration purposes) and in parallel with the capacitors so that the thermistor controls the frequency of the oscillator. Thus, the circuit is merely a thermistor and an oscillation circuit using logic gates for converting the temperature variable to a frequency variable TSO. The microcontroller may turn the oscillator on and off by an enabling signal TLBSEN to thereby control its operation and also measures the period of the oscillation to compute the temperature. In order to conserve power, the oscillator is normally maintained off and at intervals of approximately 16 seconds is turned on long enough to measure the temperature. Under normal room temperature conditions the oscillator oscillates at approximately 100 Hz and stabilizes in about one to two cycles whereupon temperature measurement commences and the information is stored in the microprocessor. After approximately six measurement cycles the measurement terminates and this information is stored in the microprocessor. The difference between the two values is utilized to compute the temperature.

The room light sensor circuit 84 includes a silicon photocell 104 which operates as a light dependent resistor, the photocell preferably being a VT833 manufactured by ECG Vactec which has a very high resistance when in the dark, but a relatively low resistance when disposed in room light and is connected with a resister 106 to form a voltage divider whose output is fed to a logic circuit used as a voltage threshold detector to convert the voltage to a high or low logic level, as is well known in the art. The output of the logic circuit is low when enough light reaches the photo cell and is high when the room is dark and these signals are transmitted to the microcontroller 80. A microcontroller output LTSEN is used to enable the light sensing circuit, and when this signal is low the light sensor is disabled, but when high, the light sensing circuit is enabled. If the signal is high and the room lights are turned on, the circuit will generate an external interupt EXTINT to the microcontroller. When this occurs a signal LITEON is applied from the room light sensor logic circuit into an input of the microcontroller to determine whether the interrupt is due to the light sensor or whether it was caused by depressing a key in the keypad resulting in a low keypad external interrupt signal KYIEN from an output of the microprossesor. The light sensing circuit permits the unit to shut down when the room lights are turned off thereby greatly extending the life of the batteries. The circuit is turned on periodically during normal use to determine if the lights are still on. When the room lights go off and remain off for a predetermined period of time, the unit will shut off and go into a low power or sleep mode wherein only the room light sensor is active. When the lights are again turned on, the room light sensor will cause the unit to again begin operating normally.

The battery sensing circuits are conventional low battery detectors to determine whether the voltage supplied by the batteries are high enough to properly operate the unit, the batteries being checked periodically by comparing their outputs to a reference voltage and the output of the comparison is input to the microcontroller. Preferably the circuit is enabled so this occurs after every 4 temperature measuring cycles, e.g., approximately 1 minute.

Conventional option jumpers may be wired into the heat and cooling anticipation of the unit for damping and preventing over-shooting the selected temperature in both the heating and cooling modes. Three such jumpers may be used to set the heat anticipation and three to set the cooling anticipation, each is used to connect one of the microcontroller inputs HA0, HA1, HAZ, CA0, CA1, CA2 to either ground or input voltage VCC.

Figure 6:
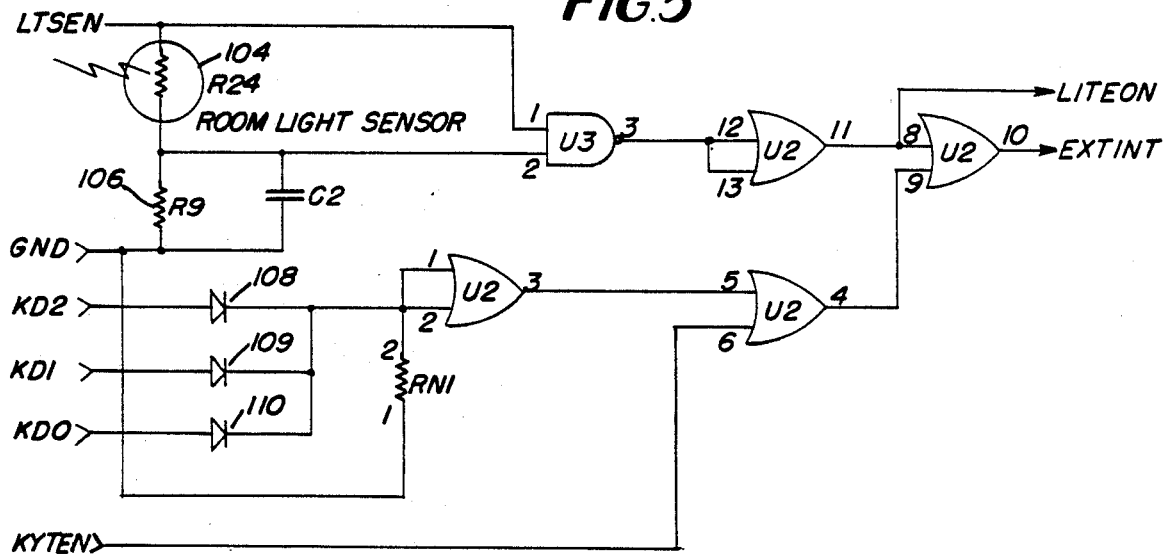
FIG. 6 is a schematic drawing of the light sensing electrical circuit of the portable control unit.

The front panel key control includes a conventional key pad 62 normally having six touch button membrane switches, with 12 being optional. The six switches correspond to cooling mode 64, heating mode 66, temperature raising 70, temperature lowering 72 and economy mode 68. The sixth switch may or may not be used, and if used may be connected to an exhaust fan or other device. The other switches may be utilized for various functions including control of a humidifier. As illustrated in FIG. 3, the keypad is arranged in three columns having either two or four rows. The keypad interfaces with the microcontroller by connections of four microcontroller outputs, KQ0, KQ1, KQ2, KQ3 which connect to one side of the keypad switch array, while the other side of the keypad switch array is wired to three microcontroller inputs KD0, KD1, KD2, and preferably includes a logic circuit to detect the presence of keypad activity resulting in a keypad interrupt when desired, the interrupt circuits also being connected to an output of the microcontroller enabling or disabling the interrupt according to the state of the output. The keypad column lines are connected to the four microcontroller outputs while the keypad row lines are connected to the inputs. When the microcontroller is in a low power state (or asleep) as when the room is dark, the keypad column lines are driven "true" and if any of the keypad keys are pressed one or more of the row lines are driven high. The diodes 108, 109, 110 in FIG. 6 feed this high level to the NOR gate U2 resulting in an external interrupt to the microcontroller causing it to wakeup and read the keypad.

The display circuit board includes a liquid crystal display 74 driven by conventional means such as an LCD segment driver which may be a Motorola Model MC145453P connected to an RC oscillator and which receives the display data over a serial circuit DSDAT and DSCLK from the microcontroller, and which generates the proper wave forms to operate the LCD display. When the lights are off and the unit shuts down, the microcontroller clears the display and sets the signal DSPEN to the driver unit to the low state so that the current drawn by the display is reduced to a minimum which again acts to prolong the life of the batteries. The liquid crystal display is utilized to display the current room temperature, the user temperature set point, and the current status of the unit, i.e., whether in heat or cooling mode, economy mode, and also a low battery indicator.

Also mounted on the main circuit board of the portable unit is the infrared transmitter 94 for transmitting information from the portable unit to the ceiling mounted receiver unit 54 to permit the portable temperature transmitting unit 52 to operate the system in a wireless manner. The infrared transmitter 94 comprises three infrared light emitting diodes 112 driven by a series of short pulses to minimize battery drain, the pulses being produced by an oscillator circuit, including a resonator 111 and a NAND gate 113, operating at approximately 450 kHz and receiving an enabling carrier signal IRCEN from the microntroller. The data signal IRDATA as a serial bit stream is fed from the microcontroller through a programmable counter/divider 115, such as a Motorola model MC 14526BCP, which reduces the frequency of the pulses fed to the LEDs by either 10 or 11 and acts together with transistors to switch the currents to the LEDs on and off as necessary. When enabled by a signal IRDEN, the data transmitted modulates the carrier frequency and occurs not only in short bursts, but also with a minimum frequency for extended battery life. The information transmitted from the infrared transmitter to the receiver is in a standard serial format using frequency shift keying and is transmitted as two 8-bit words, the second word being mainly used to check the integrity of the data. The information is received by an infrared detector diode in the remote ceiling receiving unit 54 which transmits them through wiring to an interface circuit in the main control unit, the latter also preferably mounted in the ceiling or on the air duct.

Figure 8:
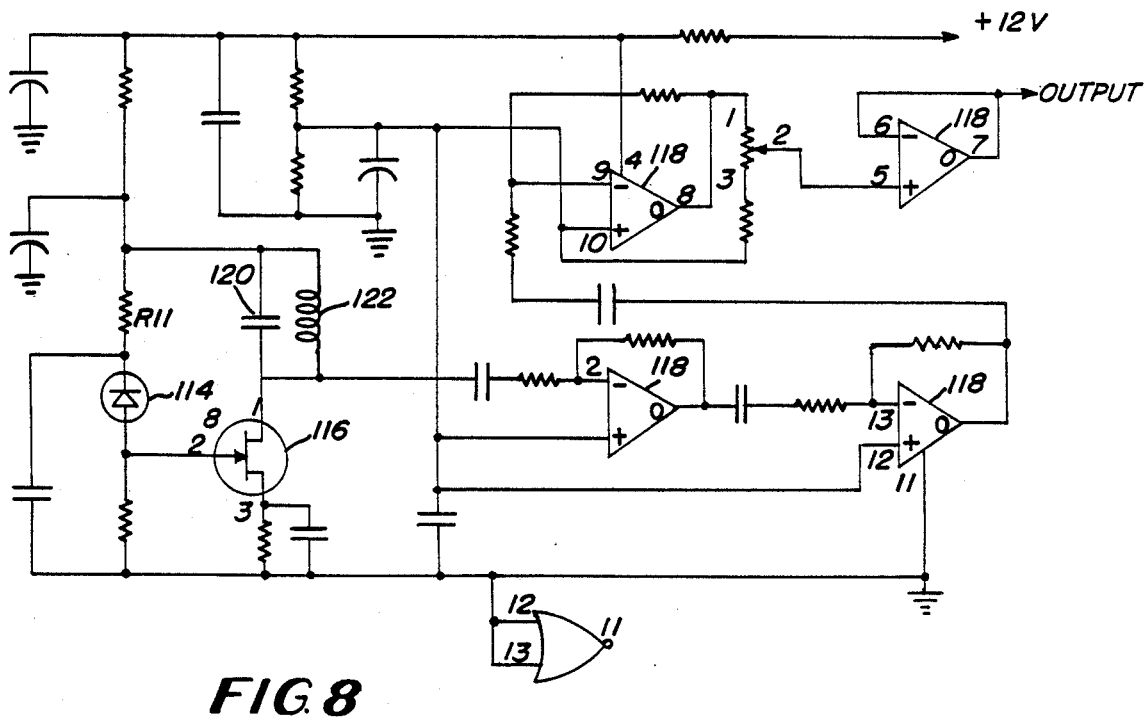
FIG. 8 is a schematic drawing of the infrared detection circuit of the receiver constructed in accordance with the principles of the present invention.
Figure 7:
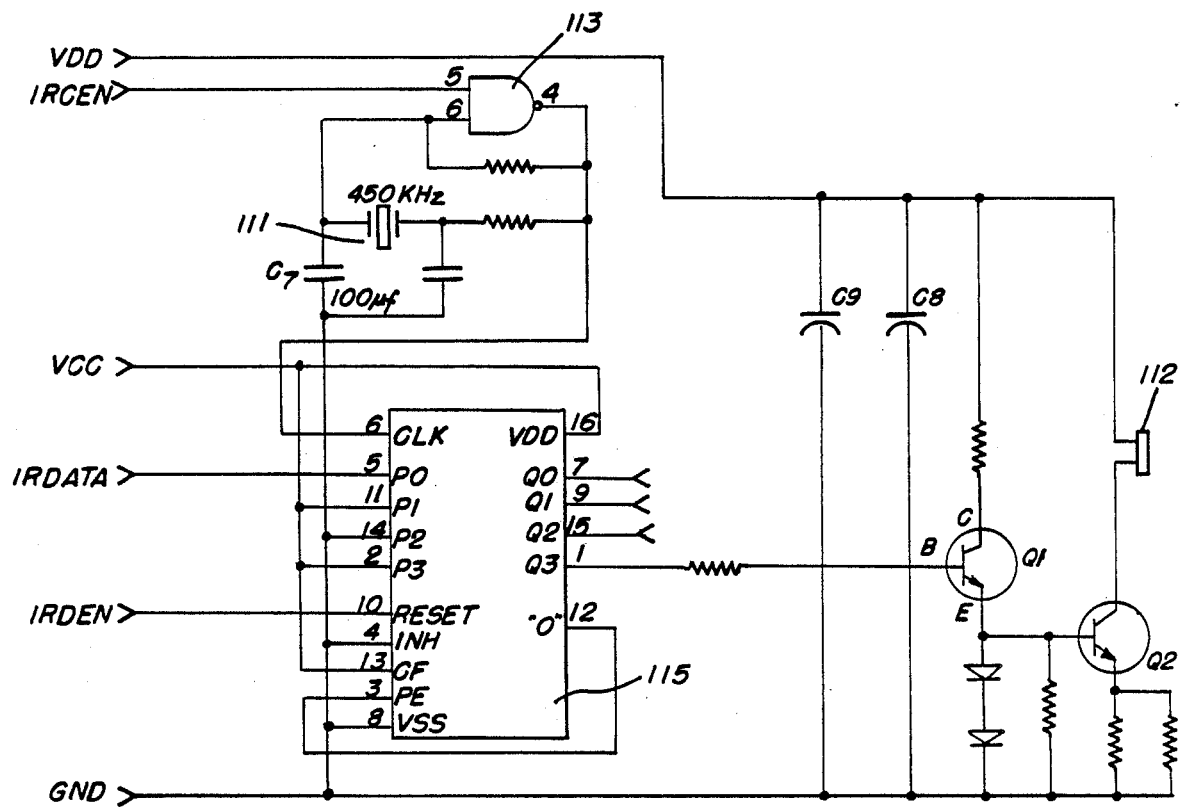
FIG. 7 is a schematic drawing of the infrared transmitter circuit of the portable control unit.

The receiver 54 is conventional and, as illustrated in FIG. 8, includes an infrared detector diode, which preferably is a silicon photodiode 114 sensitive to infrared radiation, and receives the infrared pulses from the transmitter resulting in corresponding currents flowing therethrough. The current pulses are converted to voltage pulses by appropriate resistors and fed to a preamplifier circuit comprising an FET 116 and the solid state operational amplifier 118. The preamplifier is tuned by an LC oscillator comprising the parallel capacitor and coil 120, 122 to resonate at approximately 43 kHz so that the amplifier frequency response is that of the transmitted infrared radiation and this carrier frequency is modulated by the received data signals. The receiving unit also includes a temperature sensing circuit (not illustrated) substantially identical to that in the portable temperature transmitting unit 52 which is used to control room temperature when the portable unit is not operating, such as at night, or in the event of failure of the portable unit. An overtemperature safety switch in the form of a bimetallic thermostatic switch may be incorporated as a safety feature to ensure against room temperature overheating when in the heat mode, and may be connected in series with the coil of the conventional relay of the heating unit or units.

Figure 9:
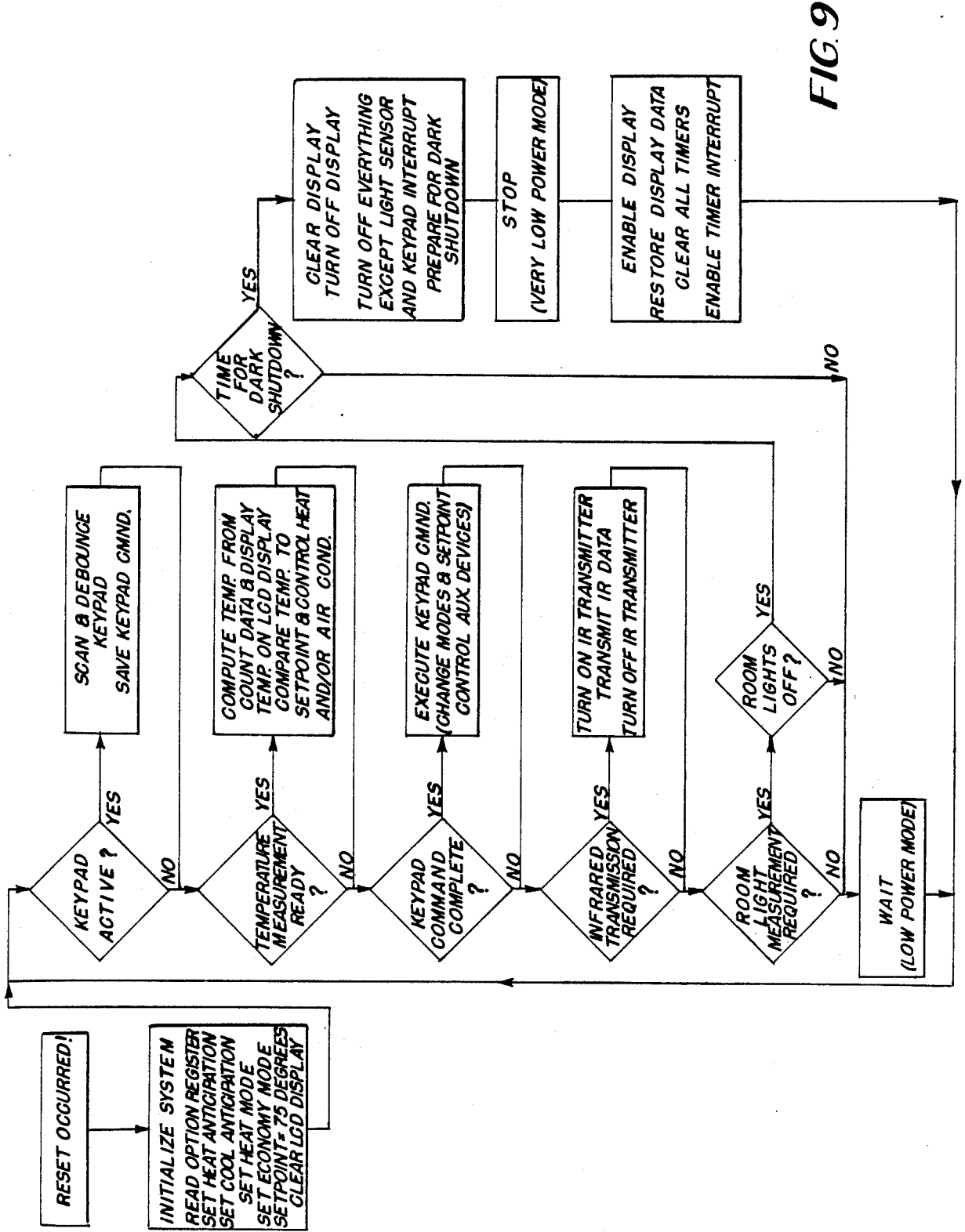
FIGS. 9 through 11 are flow diagrams illustrating the manner by which the portable control unit operates.
Figure 10:
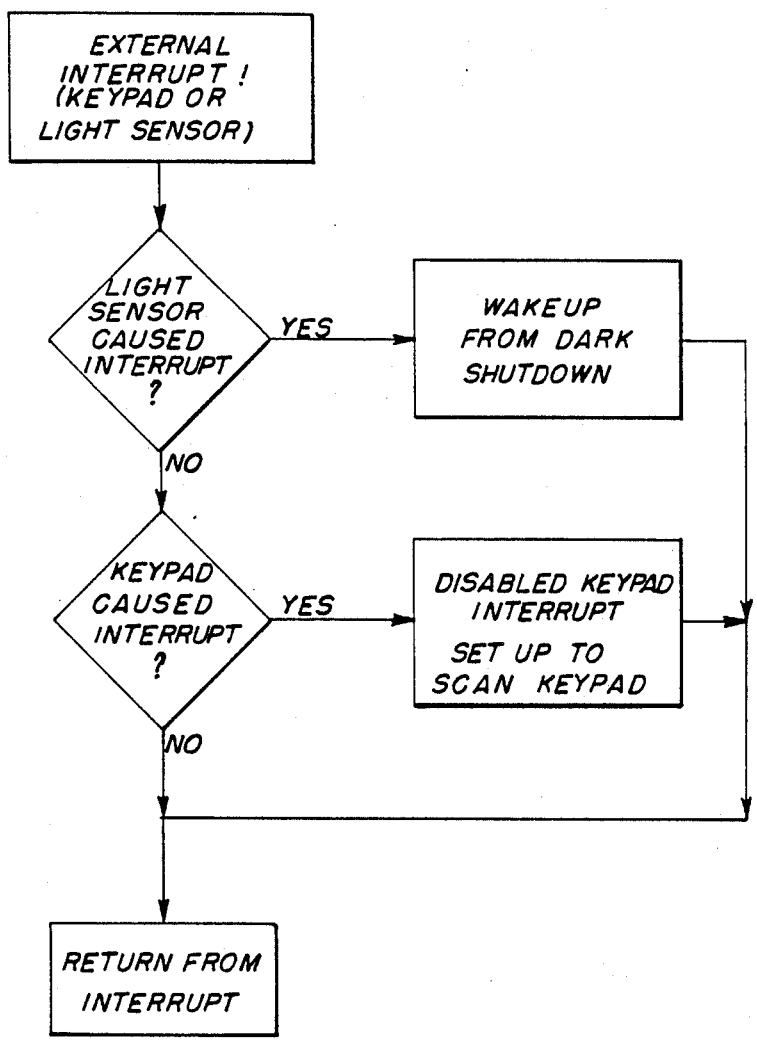
Figure 11:
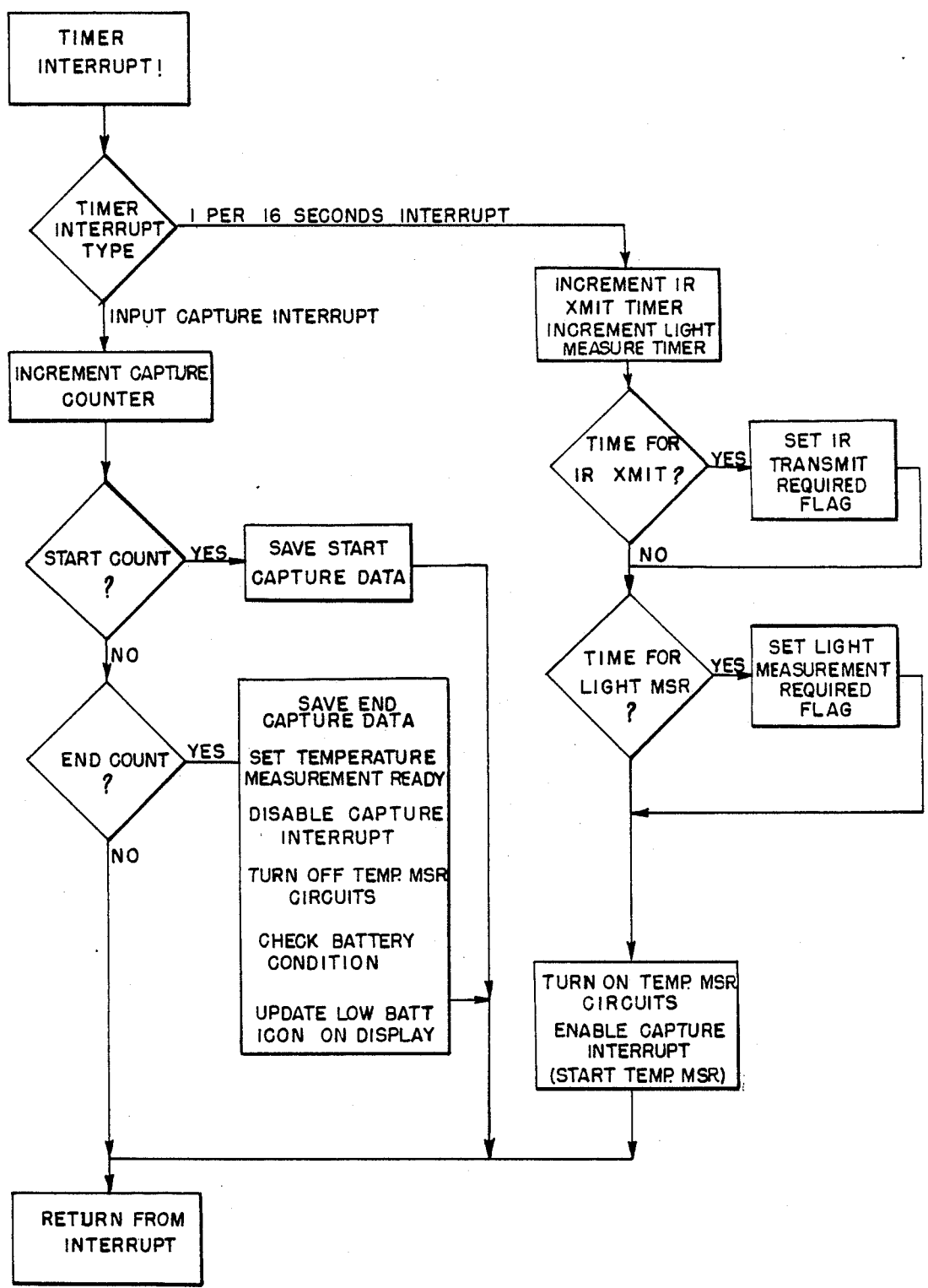

The microcomputer 80 may be programmed in conventional manner in assembly language form to control the signals supplied to the infrared transmitter 94 and the LCD display 96 in response to the temperature sensing circuit 82, the room light sensing circuit 84, the keypad 86 etc. Referring to FIG. 9, in the normal mode of operation of the unit timer interrupts, display interrupts, and keyboard interrupts are enabled after initialization of the microprocessor. The program is interrupt driven and periodically, preferably every 16 seconds as illustrated in FIG. 11, a timer overflow interrupt occurs and begins the temperature, light and battery sensing operations. A flag in the flag register of the microprocessor is programmed to signal when these are to occur. The flag register is interrogated to signal the main routine when it is time to recalculate the room temperature. When the system is initialized from a cold start, i.e., the unit is brought into the room and activated, the timer and input capture interrupts, the timer control register, the flag register, the switch register and mode register are cleared. The heat and economy modes are set, and the heat and cool anticipation jumpers are read and saved in a memory location. The infrared transmitter timer, dark period counter and, if provided for, the humidity are also cleared. The interrupts are enabled, the initial set point temperature (75° F.) is set and the display registers are cleared and the display is initialized. The microprocessor then enters the main program loop.

The microprocessor thereafter interrogates the keyboard to determine whether it has been activated and if so the signal is received and transmitted from the front panel control to the microprocessor. The temperature measurement flag is thereafter tested to determine if the temperature is to be computed, and if so the microprocessor computes the temperature every 16 seconds from the contents of the capture register, displays it on the LCD 74 and performs the temperature control after comparing the computer temperature with the initial set point or the temperature selected by the keyboard 62. If an input is supplied from the keypad the command is executed, and if an infrared transmission is required the data is transmitted from the infrared transmitter 94 to the remote receiver 54. The room light measurements flag is thereafter tested and if clear the room lights sensing circuit signal is interrogated to determine if the room lights are on or off. If the flag is clear or if the room lights are on the system enters a wait mode so as to reduce the battery drain. If the room light shut-down flag is clear the system enters the wait mode, but if the room lights have been turned off and remained off for a minimum length of time, e.g., a few minutes, the unit is prepared for a total shut-down and turns off all circuits which can cause power consumption from the battery. The circuits which are turned off include the temperature and low battery sensor circuits 82, 88, the infrared oscillator and transmitter circuits 94, the display circuits 96, and the microcontroller internal circuits including the timer and clock circuit. The room light sensor circuit 84 is activated prior to the shut-down so that the unit can resume normal operation when the room lights are turned back on. The keypad circuit 86 is also left active so that the unit will resume normal operation if any of the keys are pressed. Thus, the system is shut down and awaits an external interrupt. The program is interrupt driven and if the system is not shut down it remains in the wait mode awaiting a timer or external interrupt The light sensor will generate an external interrupt, see FIG. 10, to the microcontroller if the light sensor is enabled and the room lights are turned on, thereby resulting in re-activation of the unit. Once the lights are on, the room light measurement interrupt is disabled and the external interrupt is again enabled. If an external interrupt is caused by closing one or more of the keypad switches, the keypad active flag is set and the keypad interrupt is disabled. The keypad is then scanned to determine the active key switch. After the key has been decoded and inactive for a fraction of a second, the keypad active flag will be cleared, the keypad interrupt enabled, and the routine returned to the main loop. The keypad may signal a change from cool to heat mode, a raising or lowering of the temperature setpoint, a selection of the economy mode, a turning on or off of a humidifier and/or additional auxiliary devices which may be located either in the room or outside the room.

Under normal circumstances, the economy mode will always be selected so that when the lights are off the temperature in the room will drop to an economy setting such as 66° during the heat mode or 82° during the cooling mode. If a change in temperature setpoint has been called for, the display will be updated to show the new setpoint on the LCD display 74, and a binary representation of the setpoint temperature calculated to be used in the temperature control routine, unless the setpoint temperature is already at its upper limit when the setpoint has been selected to be increased, or at its lower limit when the setpoint has been selected to be decreased. The temperature control routine compares the setpoint to the room temperature and turns the room heating or cooling on and off as required to maintain the room temperature at the desired setpoint temperature. During the heating mode if the room temperature falls approximately 1.5° F. below the setpoint, the unit 52 will signal the infrared transmitter to transmit a command to the receiver 54 to supply heat. When the room temperature rises to the setpoint minus the value programmed into the heat anticipation jumpers the unit will transmit a command to stop supplying heat. During the cooling mode if the temperature rises above the setpoint by 1.5° F. the unit 52 will transmit a command to the infrared receiving unit 54 to supply cooling air, and when the room temperature falls to the setpoint plus the value programmed into the cool anticipation jumpers, the unit will transmit a command to the infrared unit to stop supplying the cooling air.

Normally the keypad interrupt is always enabled so that the microprocessor can spend as much time as possible in the "wait" mode to minimize power consumption. For the keypad to cause an interrupt, the microcontroller external interrupt must be enabled, and KYIEN must be true. A closure of any of the enabled keypad keys will then cause a keypad external interrupt. The light sensor, as aforesaid, may also cause an external interrupt. Additionally, in reference to FIG. 11, a timer interrupt may be caused either by a trigger of the input capture pin, or by timer overflow. The source of the timer interrupt is determined by testing the timer status register. If the interrupt is due to timer overflow, which occurs every 16 seconds, it is time to start a temperature measurement and update the display. If the interrupt is due to a trigger received on the input capture pin, the temperature measurement is either being set up or is in progress. If the interrupt is due to an input capture event and the input capture interrupt counter is correct to start a temperature measurement the input capture registers are read and the information saved in the start count register. If the input capture interrupt counter is correct to end the temperature measurement the input capture registers are read and saved in the end count register, the temperature measurement ready flag is set and the input capture interrupt is disabled. The battery condition is thereafter checked and the Low Battery Indicator on the LCD display set accordingly. The temperature and battery test enable TLBTEN is then turned off. If the interrupt was due to timer overflow the input capture event counter is cleared, the input capture interrupt enabled, and the temperature measurement and battery test TLBTEN is turned on. When completed a return from the interrupt occurs and the main loop program is re-entered. The normal cycle time for the main loop is approximately 0.1 second. Thus a timer interrupt occurs once every 16 seconds to read the temperature and substantially the remainder of the time the unit is in a "wait" or low power mode awaiting interrupts.

Figure 2:
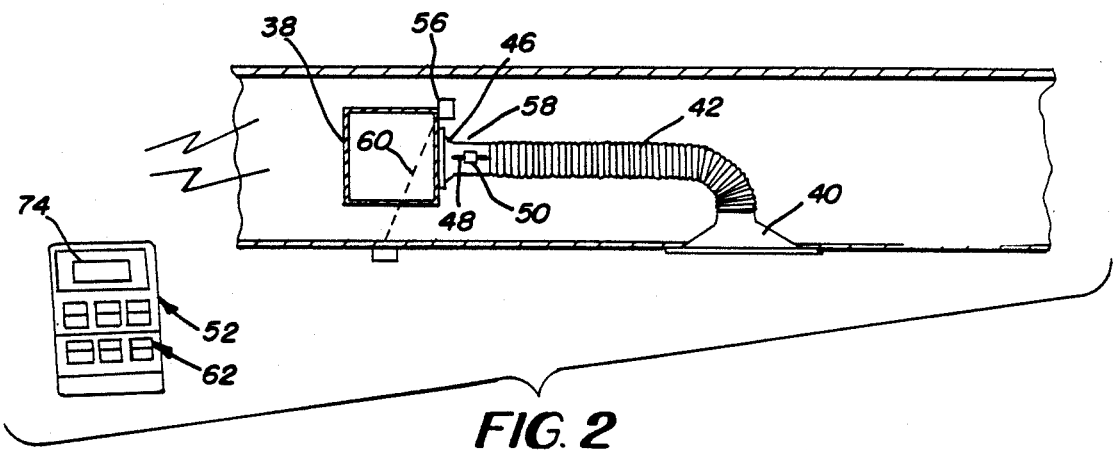
FIG. 2 is a fragmentary cross sectional view taken substantially through a ceiling in a typical one of the offices illustrated in FIG. 1.

Accordingly, the portable temperature transmitting unit can be utilized to select the various modes and the desired room temperature, and the information which is input thereto may be utilized to control the infrared ceiling mounted receiver 54 through the signals transmitted by the infrared transmitter 94. As aforesaid, the infrared receiver is direct wired to the main control unit 56 which is illustrated in block diagram form in FIG. 12. The components of the main control unit are mounted on a circuit board within a housing preferably disposed in the ceiling, or on the air flow duct as illustrated in FIG. 2. This unit interfaces with the infrared receiver and the various output devices, such as the air conditioning unit 36, the damper motors 50, the electric heaters 44, a humidifier and optional auxiliary devices which may be a music system, etc.

Figure 12:
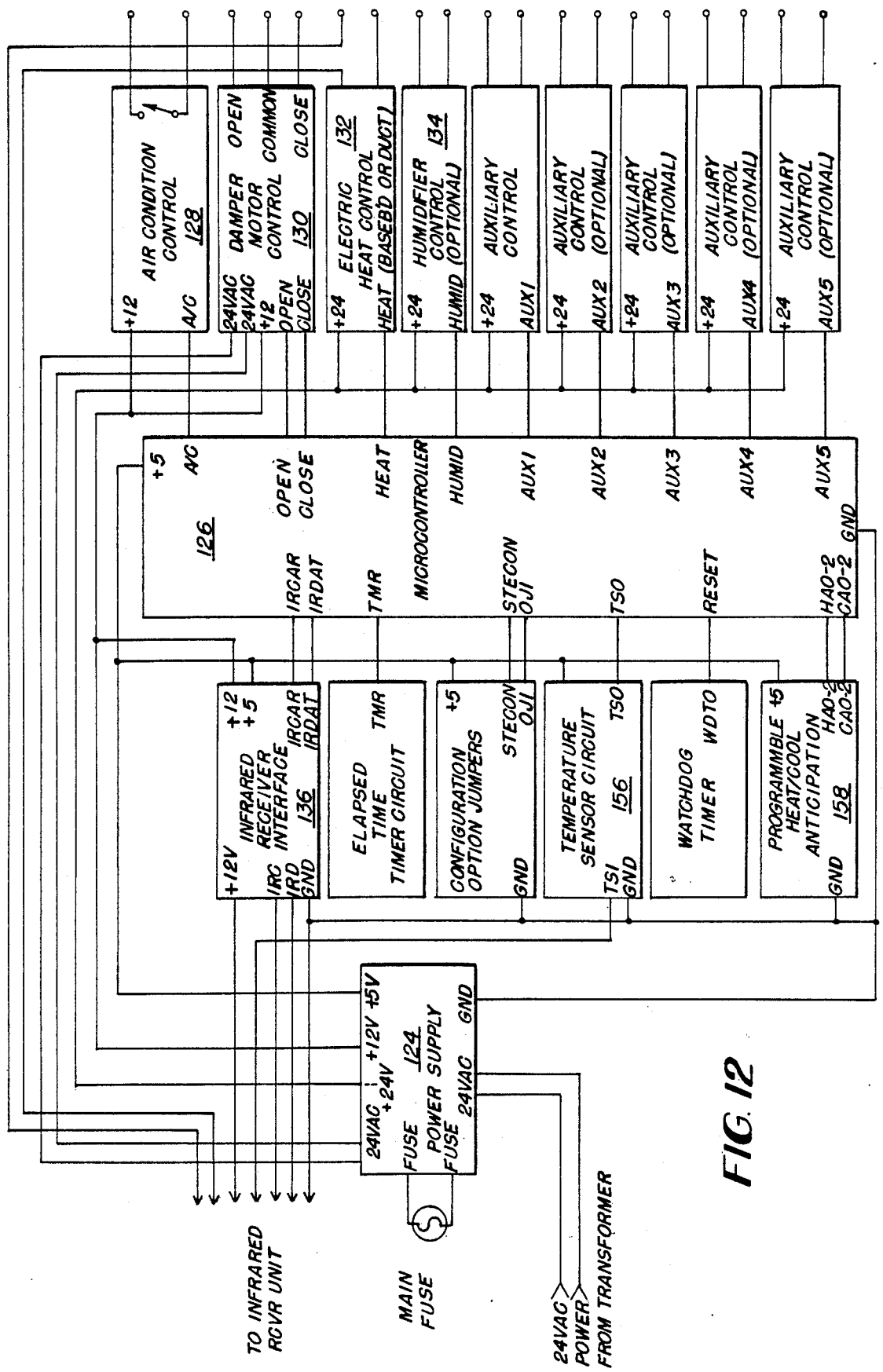
FIG. 12 is a functional block drawing of the electrical circuitry of the main control unit constructed in accordance with the principles of the present invention.

Referring to FIG. 12 the main control unit is preferably powered by an external 24 volt AC transformer (not illustrated) fed to a power supply 124 where the voltage is rectified to form a DC voltage which is regulated to form DC voltages of the appropriate magnitude to power the receiver 54, a microcontroller 126, the input circuits for the microcontroller, and the various externally controlled devices including the air conditioning control relay 128, the damper motor relays 130, and the relays to the various devices including the relay 132 for electric heaters 44, and the auxiliary devices such as the humidifier control 134. The microcontroller 126 in the preferred embodiment is a stored-program controlled processor similar to that utilized in the portable temperature transmitter unit, and again preferably may be selected from the MC68705 family of 8-bit EPROM microprocessors such as the MC68HC705C8P microcomputer manufactured by Motorola Semiconductor Products, Inc. and operates with a 4.1934 MHz crystal for compatibility with the infrared transmissions.

The receiver unit 54 interfaces with an infrared receiver circuit 136 which receives the output of the amplifier 118 of the infrared receiver and applies it to an operational amplifier 138 which provides additional amplification and applies the output to two networks. One includes the logic gates 140, 142, a one-shot multivibrator 144 senses the presence of the carrier signal from the infrared transmitter when the signal exceeds a threshold to signal a carrier detect LED on the receiver 54 and to stop the output of the phase shift keying network from reaching the microcontroller 126 when the IR signal is weak or not present. The output of the amplifier 138 is also applied to a phase shift and detecting network comprising the gates 142, 146, the coil 148, the capacitor 150 and resistor 152 to demodulate the information transmitted by the infrared system and pass the demodulated data which is gated by the output of the carrier detect signal by means of the logic gate 154 to the microcontroller. The circuitry in the infrared receiver interface is conventional and no further description is deemed necessary.

Figure 13:
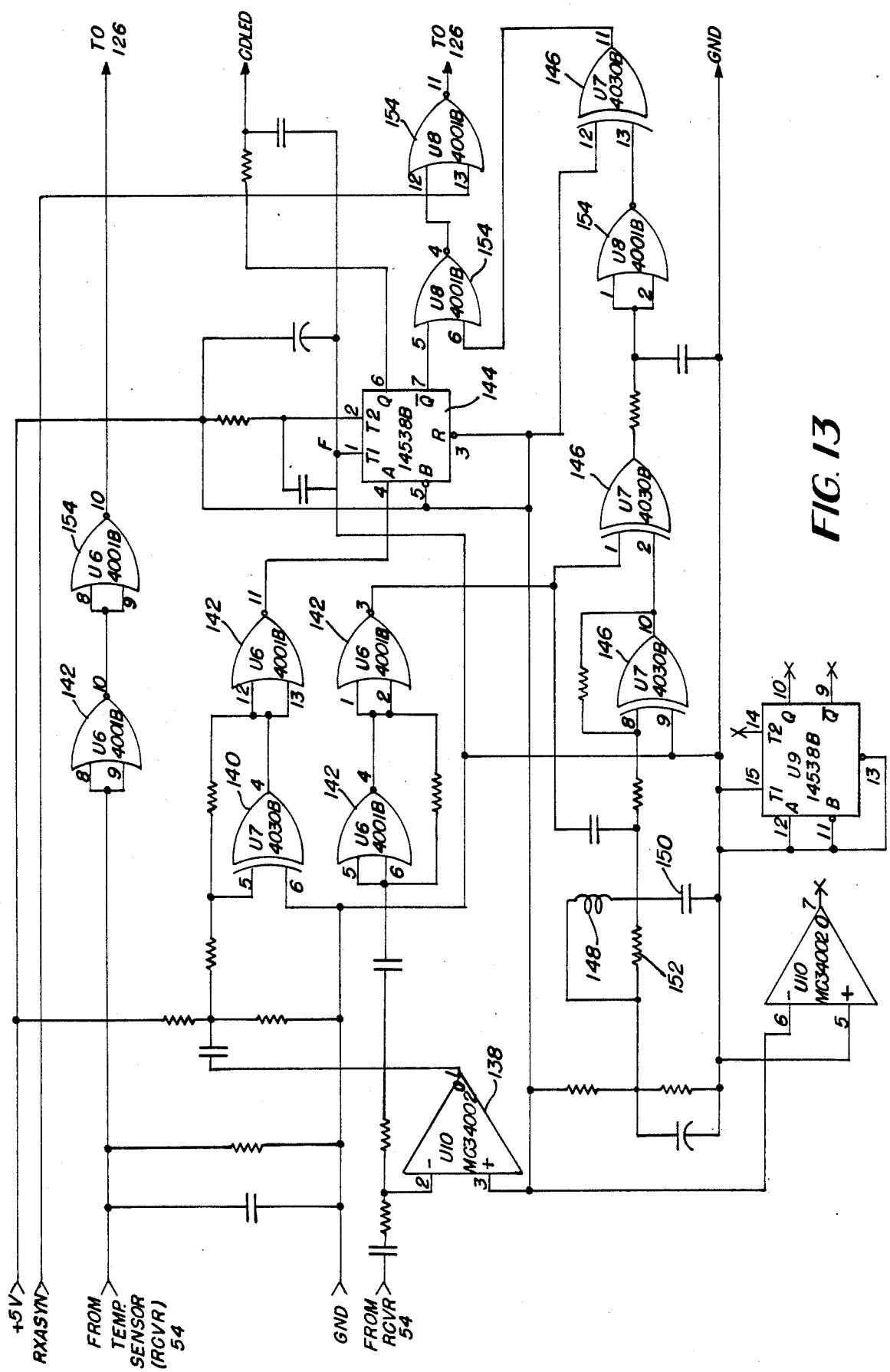
FIG. 13 is a schematic drawing of the interface circuit between the receiving unit and the main control unit.

The temperature sensing circuit 156 shown in block form in FIG. 12 is actually within the infrared receiver, but is here illustrated for purposes of clarity. It should be understood that this sensing circuit may be physically located with the receiving unit, or with the main control unit, but since the receiving unit preferably is mounted in the ceiling of the room while the control unit may be mounted on an air duct, the physical location is preferred to be associated with the receiving unit. The interface between the sensor and the microcontroller is illustrated in the upper portion of FIG. 13 and includes the gates 142 and 154. The microcontroller may be programmed for heating and cooling anticipation when the main control unit is controlling the room temperature. This simply is provided by a series of option switches in the circuit 158, three being utilized for cooling anticipation and three for heating anticipation for applying signals CA0, CA1, CA2 and HA0, HA1, HA2 respectively.

The system is intended to control a room environment where cooling is supplied by a forced air cooling system utilizing damper vanes 48 mounted in the duct work which carries the cooling air to the room as illustrated in FIG. 2. The output from the main control unit 56 may be utilized to open and close the damper vanes 48 as necessary, the vanes preferably being controlled by a reversible small synchronous motor 50 utilized to open the vanes and to close the vanes. The output of the main control unit 56 preferably is wired into the air conditioning system so that the cooling system will run when in the cooling mode and when cooling is called for. The output when the unit is in the heating mode is utilized to operate an electric heating system by means of an external relay which may be switched on and off by the microcontroller. An output is also provided for operating a humidifier when the humidifier button is pressed on the keyboard 62 of the portable unit.

When the main control unit 56 receives messages from the portable unit 52 through the receiver 54, the main unit acts to control the output devices accordingly. When the main unit stops receiving messages from the portable unit after a few minutes, the main unit takes over the regulation of room temperature, such as for example, when the room lights are turned off. If the system is in the economy mode when the main unit takes over, it will maintain the temperature in the room between 66° F. and 82° F. As long as the room temperature is within that range, the heating and cooling to the room will be off, but if the temperature falls out of that range, either heating or cooling will be supplied, if not already being suplied, to maintain the room temperature within the desired range. If the system is not in the economy mode when the main control takes over, the main control will maintain the room temperature between 70° F. and 74° F., and either heating or cooling, if not already being supplied, will be switched on as necessary to maintain the temperature within that range.

Figure 5:
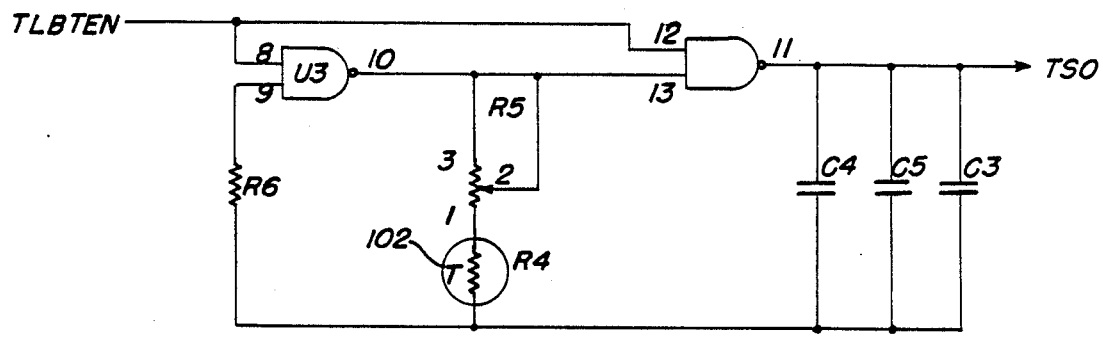
FIG. 5 is a schematic drawing of the temperature sensing electrical circuit of the portable control unit.

As aforesaid the main control unit utilizes the temperature sensing circuit of the receiver, the circuit having an RC oscillator and a thermistor such as in the temperature sensing circuit of the portable unit as illustrated in FIG. 5. The output of the oscillator is connected to an input of the microprocessor and temperature measurement is begun by storing the contents of the timer capture register. After completion of one cycle of the oscillator the contents of the capture register are again stored. The difference between the two values is then used to compute the temperature. The selected set points for the temperature control as aforesaid are set to 66° F. as a lower set point and 82° F. as an upper set point in the economy mode, while in the non-economy mode the lower set point is 70° F. and the upper set point is 74° F. These are programmed into the memory of the microprocessor utilizing assembly language into the microcontroller 126 along with the other required information relating to the oscillator cycle, the heat and cool anticipation information and the other interface parameters including the output controlled devices in conventional manner so that the various registers within the microcomputer are properly programmed.

Figure 14:
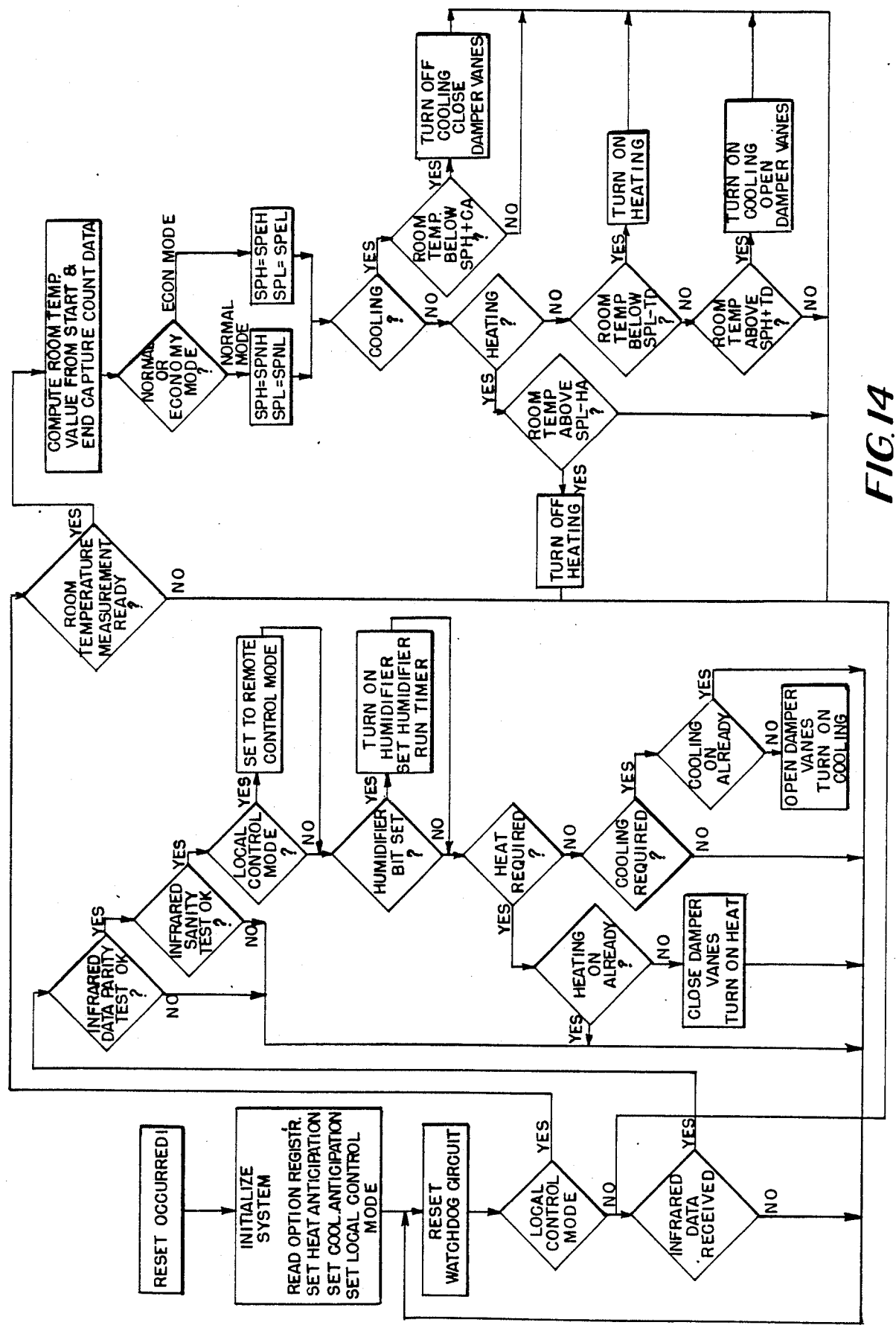

As illustrated in FIG. 14, the program after microprocessor power-up and initialization by reading the registers, initializing the heat and cool anticipation and enabling the interrupts, enters the main loop where it interrogates whether or not the portable temperature transmitter unit or the temperature sensor of the main control unit i.e., the receiver, is controlling the temperature. If the temperature is being controlled by the local temperature sensing circuit, as for example, when infrared signals are not received for an interval of a few minutes, determination is made as to whether it is time to make a room temperature measurement, if not it returns to test to see if new infrared data has been received. If the temperature measurement test is positive, the new room temperature is computed and temperature control is performed as heretofore outlined. The room temperature in either the normal or the economy mode are compared to the upper and lower set points to determine whether the room temperature is within the required range in either mode, and if not correction is made by signaling the appropriate output device to either cool or heat the room as required. If the room temperature is below the upper set point the dampers are closed and, if all the dampers in the system are closed, cooling is turned off, but if the room temperature is not below that value cooling continues and the damper vanes remain open. If the room temperature is above the upper set point plus a small temperature differential and neither heating nor cooling has been called for, then the air conditioning system is turned on and the damper vanes are opened. If the system is in the heating mode and the room temperature is above the lower set point minus the heat anticipation value then the heaters are turned off, if below that temperature the heaters remain on. If the room temperature is below the lower set point and a temperature differential then the heaters are turned on.

If signals are being received by the infrared receiver 54a verification of the parity and the logic of the data (sanity) is made and if both are verified to be correct the data is used for control of the temperature and the humidity (and any other auxiliary devices which may be connected to the main control unit). If the data has not passed muster the IR data is ignored and the system waits for the next IR data transmission, e.g., approximately one minute, and the new data has been verified. After verification the selection made by the portable unit controls the room conditions, but again if valid data is not received within a few minutes the main control unit goes into the local control mode. If humidification has been selected the microprocessor turns on the humidifier and begins to count until approximately a two hour period has expired, whereupon the humidifier is turned off.

Figure 15:
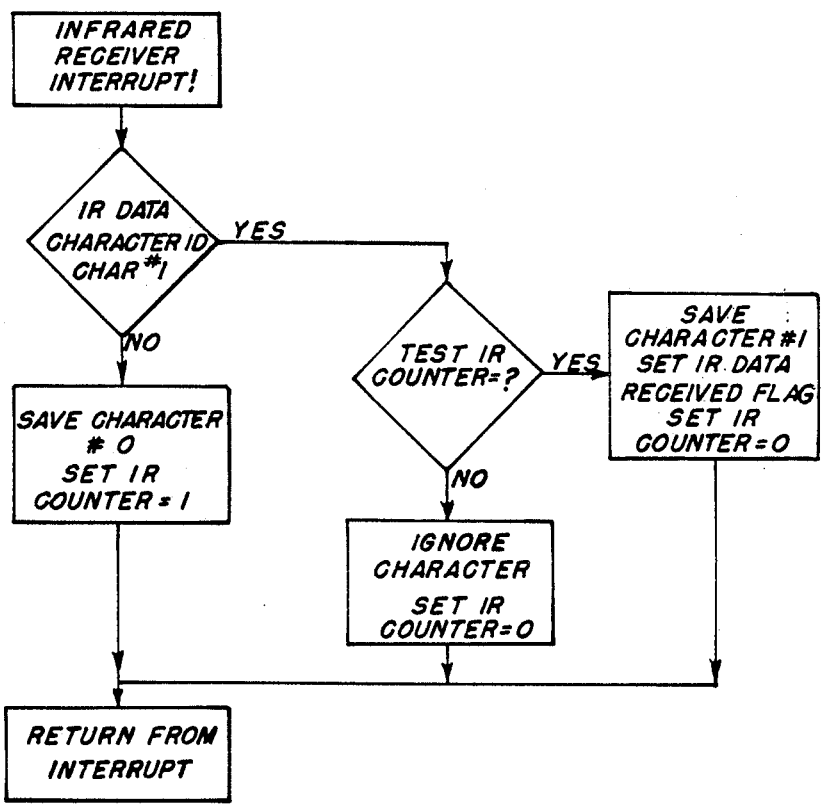
FIGS. 14 through 16 are flow diagrams illustrating the manner by which the main control unit operates to control the environmental conditions within a room.
Figure 16:
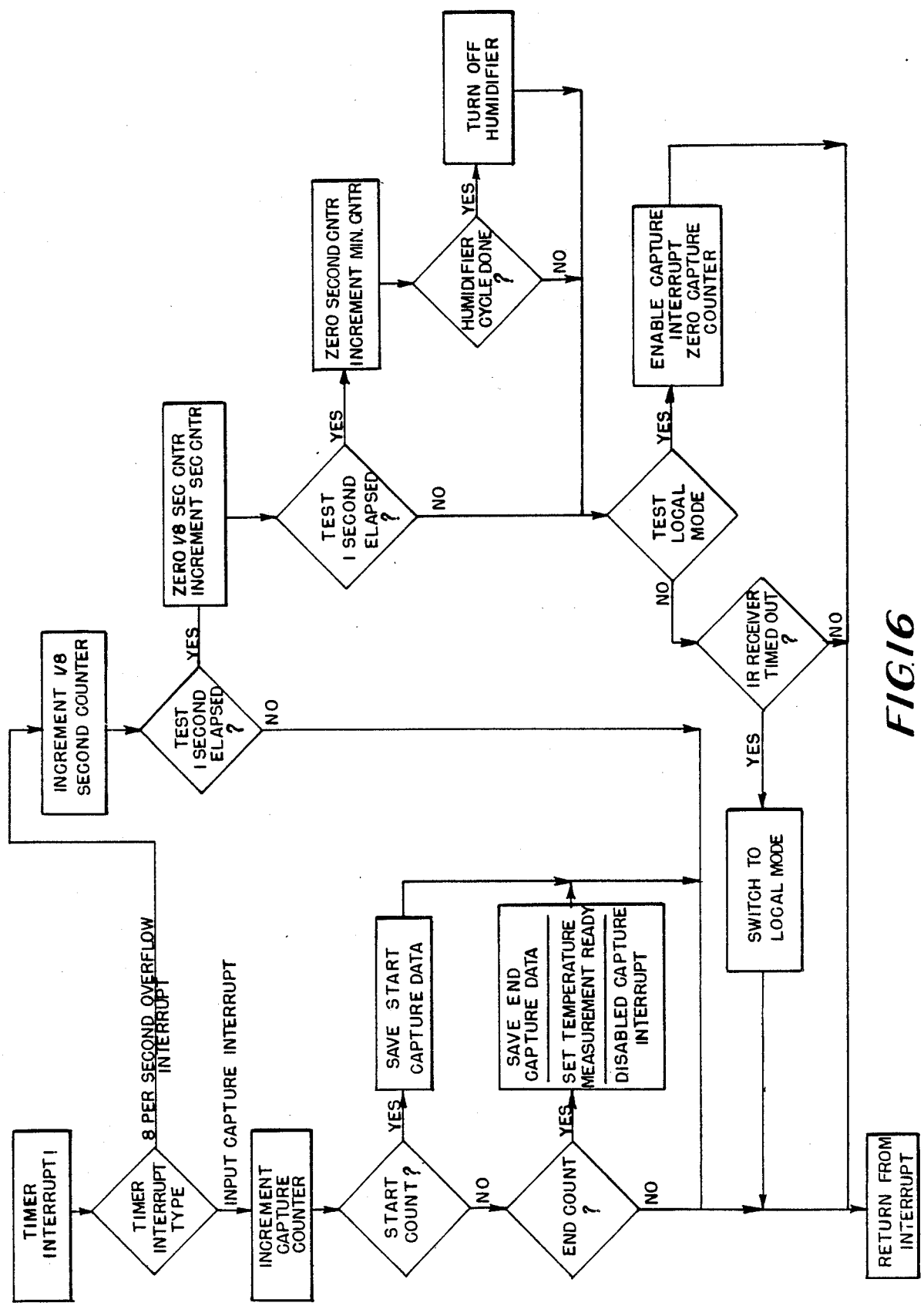

The program is also interrupt driven by an infrared transmission as illustrated in FIG. 15, or a timer interrupt as illustrated in FIG. 16. If an interrupt in the system occurs due to a transmission from the portable control unit 52 the microcontroller reads the status and data registers and if the appropriate bits are correct transmits the data, resets the infrared counter and sets the infrared reception complete flag. A timer interrupt similar to that associated with the microcontroller of the portable unit may also occur. The interrupt may be caused by either a trigger of the input capture pin or by timer overflow, the source of the interrupt being determined by interrogating the timer status register. If the interrupt is due to timer overflow, which occurs approximately every ⅛ of a second, it may be time to start a temperature measurement while in the local control mode. If the interrupt is due to a trigger received on the input capture pin, a temperature measurement is either being set up or is in progress. If the system is not in the local control mode the infrared reception timer is tested, and if it has timed out without receiving an infrared data transmission, the system is switched to local control. When the humidifier is turned on a timer is set and maintained to turn the humidifier off after a period of time of approximately two hours. The microprocessor may also be programmed to turn the damper motors off after they have been running for a short period of time so as to not overload the motors.

Accordingly, the environmental conditions in each room or space in a suite of rooms in a building may be individually controlled by the occupant while there, or switched to an economy mode by the loss of light in the room and controlled by the main control unit 56. The invention permits the portable remote unit 52 to signal and override the main unit when the room is occupied. If transmissions from the portable unit are not received by the receiving unit 54 after a few minutes, the main control unit 56 takes over to maintain the room within an economically reasonable temperature range whether or not the economy mode has been selected previously. In the economy mode the temperature conditions within the room will provide an even greater economical benefit. An occupant may select either a lower or higher temperature setting to override the economy mode while in the room.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Apparatus for controlling the temperature in a plurality of individual rooms in a group of rooms sharing a common air supply conduit, said room having lights which may be selectively turned on and off and being supplied with air through a duct communicating with said air supply conduit, air cooling means selectively activated and deactivated for cooling the air in said supply conduit when activated, and a damper valve in said duct for opening and closing flow communication between said conduit and said room, said apparatus comprising electric motor means for opening and closing said damper valve, a controller for energizing said motor means to open and close said valve selectively and for activating and deactivating said air cooling means selectively, light sensing means for sensing whether said lights are on and off and for providing a signal to said controller responsive thereto, temperature responsive means for measuring the temperature proximate said room and for providing a signal to said controller when said lights are off for energizing said motor means to open said damper valve and activate said cooling means when said temperature is above a first predetermined temperature unless said valve is already open and said cooling means has already been activated, and to close said damper valve and deactivate said cooling means when said temperature is below a second predetermined temperature unless said valve is already closed and said cooling means has already been deactivated, and manually operable means for overriding the signal from said temperature responsive means to the controller when said lights are on to provide another signal to said controller for energizing said motor and activating said cooling means at a selected temperature below said first and second temperatures.

2. Apparatus as recited in claim 1, wherein said room includes heater means selectively activated to heat said room and selectively deactivated, said controller including means for activating said heater means when said lights are off in response to a signal from said temperature responsive means when said temperature is below a third predetermined temperature unless said heater means has already been activated, and for deactivating said heater means when said temperature is above a fourth predetermined temperature to deactivate said heater means unless said heater means has already been deactivated, and manually selectable means for overriding the signal from said temperature responsive means to the controller when said lights are on to provide another signal to said controller for activating said heater means at another selected temperature above said third and fourth temperatures, said third and fourth temperatures being lower than said first and second temperatures.

3. Apparatus as recited in claim 1, wherein said manually operable means includes a control unit remote from said controller, said control unit including a control circuit for generating a control signal representative of said selected temperature, and signal transmitting means for transmitting said control signal to said controller.

4. Apparatus as recited in claim 3, wherein said control circuit includes manually depressible keys mounted in said control unit for selecting said selected temperature.

5. Apparatus as recited in claim 3, wherein said control unit includes means for disabling said signal transmitting means in response to a signal provided by said light sensing means when said lights are off.

6. Apparatus as recited in claim 3, wherein said signal transmitting means includes infrared transmitting means for transmitting an infrared signal responsive to said control signal, and infrared receiving means coupled to said controller for interpreting said infrared signal and advising said controller of said selected temperature.

7. Apparatus as recited in claim 6, wherein said control circuit includes manually depressible keys mounted in said control unit for selecting said selected temperature.

8. Apparatus as recited in claim 7, wherein said control unit includes means for selecting two different first and second predetermined temperatures.

9. Apparatus as recited in claim 8, wherein said control unit includes means for disabling said signal transmitting means in response to a signal provided by said light sensing means when said lights are off.

10. Apparatus as recited in claim 2, wherein said manually operable means and said manually selectable means comprises a common control unit remote from said controller, said control unit including control circuitry for generating control signals representative of said selected temperatures, and means for transmitting said control signals to said controller.

11. Apparatus as recited in claim 10, wherein said control circuitry includes manually depressible keys mounted in said control unit for selecting said selected temperatures.

12. Apparatus as recited in claim 10, wherein said signal transmitting means includes infrared transmitting means for transmitting infrared signals responsive to said control signals, and infrared receiving means coupled to said controller for interpreting said infrared signals and advising said controller of said selected temperatures.

13. Apparatus as recited in claim 12, wherein said control circuitry includes manually depressible keys mounted in said control unit for selecting said selected temperatures.

14. Apparatus as recited in claim 13, wherein said control unit includes means for selecting two different first and second predetermined temperatures and two different third and fourth predetermined temperatures.

15. Apparatus for controlling the temperature in a plurality of individual rooms in a group of rooms sharing a common air supply conduit, said room having lights which may be selectively turned on and off and being supplied with air through a duct communicating with said air supply conduit, air cooling means selectively activated and deactivated for cooling the air in said supply conduit when activated, and a damper valve in said duct for opening and closing flow communication between said conduit and said room, said apparatus comprising:
 first means for determining the temperature in said room;
 second means for providing a signal representative of the temperature of said room;
 third means for sensing the presence or absence of light in said room;
 fourth means for providing a signal indicative of the presence or absence of light in said room;
 manually operable temperature selecting means for selecting a desired room temperature;
 fifth means for providing a signal representative of the desired temperature;
 motor means for selectively opening and closing said damper valve; and
 control means coupled to said second, fourth and fifth means and to said motor means and said air cooling means for opening and closing said damper valve selectively and for activating and deactivating said air cooling means selectively to maintain said room substantially at said desired temperature when said lights are on, and for disregarding the signal provided by said fifth means and maintaining the room substantially at a preselected temperature independent of said desired temperature when said lights are off, said control means comprising a portable manual unit and a fixed controller; said control unit including signal transmitting means; signal receiving means operatively coupled to said controller; said controller being further operatively coupled to said motor means and said air cooling means; said signal transmitting means only being operable when said fourth means provides a signal indicative of the presence of light, and said controller having means operable when no transmission signal is received by said receiving means for controlling said room at said predetermined temperature.

16. Apparatus as recited in claim 15, wherein said control unit includes means for manually selecting one of an upper and a lower preselected temperature.

17. A method of controlling the temperature within one room of a group of rooms sharing a common air supply conduit, said room having lights which may be selectively turned on and off and being supplied with air through a duct communicating with said air supply conduit, air cooling means selectively activated and deactivated for cooling the air in said supply conduit when activated, and a damper valve in said duct for opening and closing flow communication between said conduit and said room, said method comprising:
 (a) providing a first signal for controlling the opening and closing of said damper valve and the activating and deactivating of said air cooling means to maintain said room substantially at a first preselected temperature when said lights are on;
 (b) turning off said lights to disable said first signal and to provide a second signal;
 (c) controlling the opening and closing of said damper valve and the activating and deactivating of said air cooling means to maintain said room substantially at a second preselected temperature while said lights are off in accordance with said second signal; and
 (d) permitting said first signal to control the opening and closing of said damper valve and the activating and deactivating of said air cooling means only while said lights are on.

18. In a method as recited in claim 17, wherein said controlling of said second temperature comprises manually selecting one of two temperatures while said lights are on.

19. In the method as recited in claim 17, wherein said providing of said first signal comprises manually selecting said first temperature.

* * * * *